United States Patent
Uno et al.

(10) Patent No.: US 9,892,348 B2
(45) Date of Patent: Feb. 13, 2018

(54) PRINTING DEVICE AND METHOD FOR CONTROLLING POWER SUPPLIED FROM THE PRINTING DEVICE TO AN EXTERNAL DEVICE

(71) Applicant: Seiko Epson Corporation, Tokyo (JP)

(72) Inventors: Akihiro Uno, Shiojiri (JP); Shinichi Yoshie, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/049,178

(22) Filed: Feb. 22, 2016

(65) Prior Publication Data

US 2016/0267367 A1 Sep. 15, 2016

(30) Foreign Application Priority Data

Mar. 13, 2015 (JP) ................................ 2015-050504

(51) Int. Cl.
| | |
|---|---|
| *G06K 15/00* | (2006.01) |
| *G06F 1/26* | (2006.01) |
| *G06F 1/32* | (2006.01) |
| *G06K 15/02* | (2006.01) |
| *B41J 3/44* | (2006.01) |

(Continued)

(52) U.S. Cl.
CPC ............ *G06K 15/4055* (2013.01); *B41J 3/44* (2013.01); *B41J 29/00* (2013.01); *G06F 1/26* (2013.01); *G06F 1/266* (2013.01); *G06F 1/3287* (2013.01); *G06K 15/028* (2013.01); *G06F 1/3206* (2013.01); *G06F 1/3253* (2013.01); *G06F 1/3284* (2013.01); *G06F 1/3296* (2013.01); *H02J 7/00* (2013.01)

(58) Field of Classification Search
CPC ...... G06F 1/266; G06F 1/3287; G06F 1/3206; G06F 1/3296; G06F 1/3284; G06F 1/3253; G06F 1/26; G06K 15/4055; G06K 15/028; B41J 29/00; H02J 7/00
USPC ............ 713/300, 310, 324; 710/15; 347/171
See application file for complete search history.

(56) References Cited

U.S. PATENT DOCUMENTS

| | | |
|---|---|---|
| 7,852,043 B2 | 12/2010 | Kawamoto et al. |
| 7,928,689 B2 | 4/2011 | Kawamoto et al. |

(Continued)

FOREIGN PATENT DOCUMENTS

| | | |
|---|---|---|
| JP | 2005-012889 A | 1/2005 |
| JP | 2005-125634 A | 5/2005 |

(Continued)

*Primary Examiner* — Ji H Bae
(74) *Attorney, Agent, or Firm* — Foley & Lardner LLP

(57) ABSTRACT

A printing device that and a control method of the printing device enable supplying power to a connected external device without affecting operation of the printing device. A thermal printer 1 has a USB connector 15 that connects to a smart device 2; a power supply circuit 14; a print mechanism 17 that operates using power supplied from the power supply circuit 14; a communicator 16 that communicates with the smart device 2; and a controller 11 that receives a command to start or stop operation of the print mechanism 17 from the smart device 2 through the communicator 16, and controls the power supply to the smart device 2 from the power supply circuit 14 according to the timing when operation of the print mechanism 17 starts and stops.

20 Claims, 6 Drawing Sheets

(51) Int. Cl.
*B41J 29/00* (2006.01)
*H02J 7/00* (2006.01)

(56) References Cited

U.S. PATENT DOCUMENTS

| | | | | |
|---|---|---|---|---|
| 8,462,184 | B2 * | 6/2013 | Lyons | B41J 2/32 347/171 |
| 9,024,986 | B2 * | 5/2015 | Roth | B41J 2/32 347/171 |
| 2011/0292152 | A1 * | 12/2011 | Rawlings | B41J 2/32 347/171 |
| 2012/0127517 | A1 * | 5/2012 | Oh | G03G 15/5004 358/1.15 |
| 2015/0264208 | A1 * | 9/2015 | Achiwa | H04N 1/00885 358/1.15 |
| 2016/0360477 | A1 * | 12/2016 | Saeki | B41J 29/00 |

FOREIGN PATENT DOCUMENTS

| | | |
|---|---|---|
| JP | 2007-672962 A | 3/2007 |
| JP | 2011-076310 A | 4/2011 |
| JP | 2014-109919 A | 6/2014 |

\* cited by examiner

PRINTING DEVICE AND METHOD FOR CONTROLLING POWER SUPPLIED FROM THE PRINTING DEVICE TO AN EXTERNAL DEVICE

This application claims priority under 35 U.S.C. § 119 to Japanese Patent Application No. 2015-50504, filed on Mar. 3, 2015, the entire disclosure of which is expressly incorporated by reference herein.

BACKGROUND

1. Technical Field

The present invention relates to a printing device and a method of controlling a printing device.

2. Related Art

Devices that operate using power supplied from an AC adapter are known from the literature (JP-A-2014-109919). Printing devices that can charge a mobile terminal or other external device are also known from the literature (JP-A-2005-125634). JP-A-2014-109919 describes a device that monitors and controls the load of the AC adapter, and controls the power that is consumed. JP-A-2005-125634 describes a printing device that can charge a mobile terminal whether or not the main power circuit of the printing device is on or off.

The printing device described in JP-A-2014-109919 prints by using power supplied from an AC adapter, and the printing device described in JP-A-2005-125634 supplies power to an external device. Depending on the amount of power supplied to the external device, however, the printing device of JP-A-2005-125634 may be unable to supply power sufficient for the printing operation.

SUMMARY

A printing device and a control method of a printing device according to one aspect of the invention can supply power to a connected external device without affecting operation of the printing device.

A printing device is configured to communicate with an external device and supply power to the external device. The printing device includes: a power supply; an operator configured to operate using power supplied from the power supply; a communicator configured to receive a first command from the external device, the first command instructing operation of the operator; a connector configured to connect and supply power to the external device; and a controller configured to process the first command received by the communicator, and control the power supply to change an amount of power supplied to the external device, the controller changing the amount of power supplied to the external device before processing the first command when the first command is received by the communicator.

Thus comprised, power can be supplied to an external device without affecting supplying power to the operator by controlling the supply of power to the external device based on a first command that instructs operation of the operator.

In a printing device according to another aspect of the invention, the operator includes a print mechanism and a cutter, the print mechanism being configured to print on paper, and the cutter being configured to the paper; and the first command includes a command instructing operation of the print mechanism, the first command further including a print command, a carriage return command, a line feed command, or a cutter command instructing operation of the cutter and instructing cutting the paper.

By thus controlling supplying power to the external device based on a command instructing operation of the print mechanism or the cutter, power can be supplied to the external device without affecting supplying power to the operator.

In a printing device according to another aspect of the invention, when the communicator receives a second command, which instructs ending operation of the operator, from the external device, the controller resumes supplying power to the external device after executing the second command.

By thus controlling supplying power to the external device based on a second command instructing ending operation of the operator, power can be supplied to the external device without affecting supplying power to the operator.

In a printing device according to another aspect of the invention, the operator includes a cutter configured to cut paper; and the second command is at least a cutter command instructing operation of the cutter and instructing cutting the paper.

By thus controlling supplying power to the external device based on a command instructing operation of the cutter, power can be supplied to the external device without affecting supplying power to the operator.

In a printing device according to another aspect of the invention, the power supply connects to an AC adapter, and supplies power to the operator and the external device based on power supplied from the AC adapter.

Thus comprised, power can be supplied to the external device from the AC adapter connected to the power supply.

In a printing device according to another aspect of the invention, the communicator is configured to communicate wirelessly with the external device, and the connector is configured to communicate by wire with the external device.

In a printing device according to another aspect of the invention, the communicator is configured as a single connector including the connector; and if the power supply stops supplying power to the external device through the single connector, the controller switches a voltage of power to a first voltage that is lower than a voltage that supplied power to the external device.

Thus comprised, supplying power to the external device can be controlled by changing the voltage.

In a printing device according to another aspect of the invention, the power supply is configured to supply power to the external device for charging a battery of the external device; and the controller sets the first voltage less than a first threshold value and greater than a second threshold value, the first threshold value indicating a voltage at which the external device stops the battery charging operation, and the second threshold value indicating a voltage at which the external device stops the communication operation.

Thus comprised, supplying power to the battery of the external device can be controlled by changing the voltage.

In a printing device according to another aspect of the invention, the communicator is configured as a single connector including the connector; and if the power supply starts supplying power to the external device through the single connector, the controller switches a voltage of power to a second voltage that is higher than a voltage at which power supply to the external device stopped.

Thus comprised, supplying power to an external device through a single connector used for both communication and supplying power can be controlled by changing the voltage.

In a printing device according to another aspect of the invention, the power supply is configured to supply power to the external device for charging a battery of the external device; and the controller sets the first voltage less than a first threshold value and greater than a second threshold value, the first threshold value indicating a voltage at which the external device stops the battery charging operation, and the second threshold value indicating a voltage at which the external device stops the communication operation.

Thus comprised, supplying power to the battery of the external device can be controlled by changing the voltage.

In a printing device according to another aspect of the invention, the communicator is configured as a single connector including the connector; and if the power supply starts supplying power to the external device through the single connector, the controller switches a voltage of power to a second voltage that is higher than a voltage at which power supply to the external device stopped.

Thus comprised, supplying power to an external device through a single connector used for both communication and supplying power can be controlled by changing the voltage.

In a printing device according to another aspect of the invention, the power supply is configured to supply power to the external device for charging a battery of the external device; and if the power supply starts supplying power to the external device, the controller switches a voltage of power to a second voltage that is greater than a first threshold value indicating a voltage at which the external device stops the battery charging operation.

Thus comprised, supplying power to the battery of the external device can be controlled by changing the voltage.

Another aspect of the invention is a control method of a printing device having an operator and configured to communicate with an external device and supply power to the external device, the control method including changing the amount of power supplied to the external device before processing a first command instructing operation of the operator, when the first command is received from the external device.

Thus comprised, power can be supplied to an external device without affecting supplying power to the operator by controlling the supply of power to the external device based on a first command that instructs operation of the operator.

Other objects and attainments together with a fuller understanding of the invention will become apparent and appreciated by referring to the following description and claims taken in conjunction with the accompanying drawings.

DESCRIPTION OF EMBODIMENTS

Embodiment 1

Figure 1:
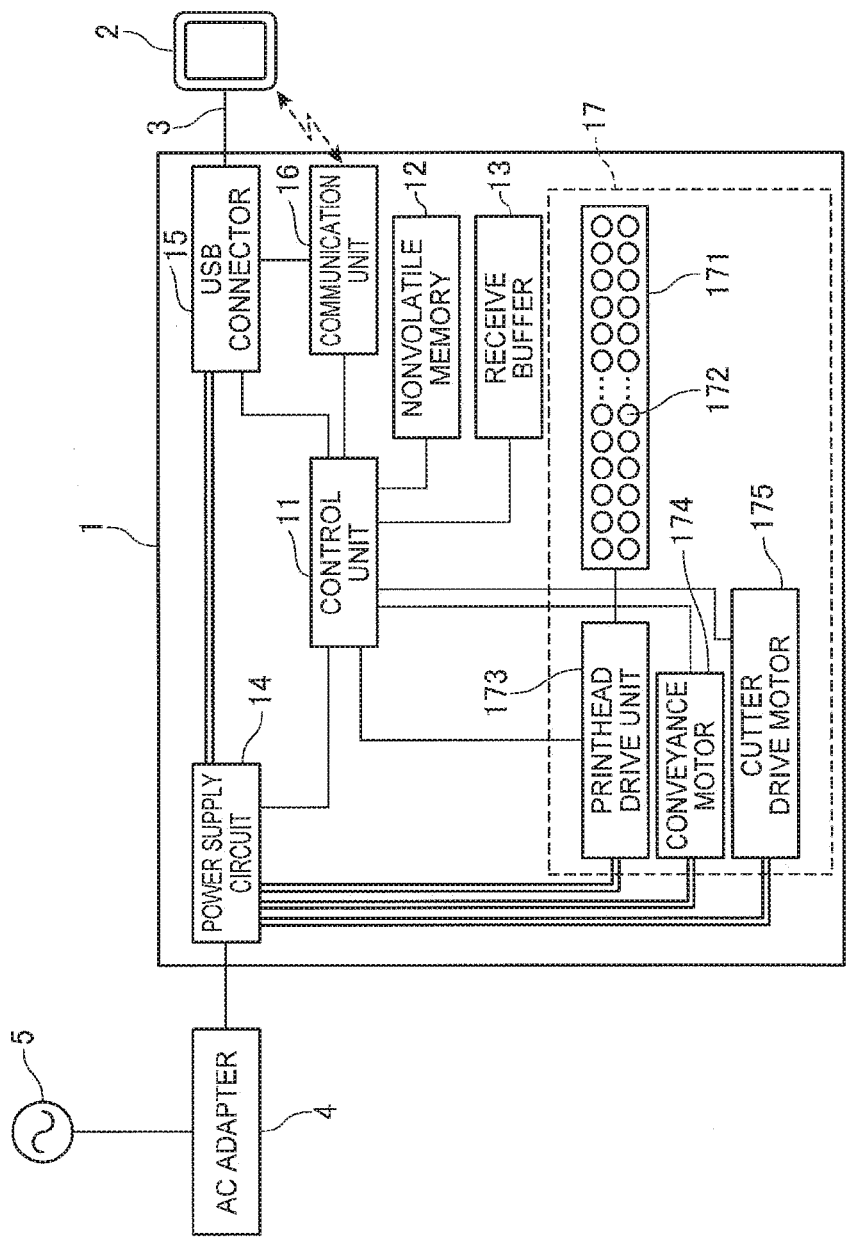
FIG. 1 is a function block diagram of a thermal printer according to a first embodiment of the invention.

FIG. 1 is a function block diagram of a thermal printer 1 (printing device) according to the first embodiment of the invention.

The thermal printer 1 is a device that prints text and images on a recording medium based on data input from a smart device 2 (external device), and operates using power supplied from an AC adapter 4 connected to a commercial power source 5. The thermal printer 1 stores thermal roll paper as the recording medium in the printer, and prints text or images by applying heat to the recording surface of the thermal roll paper with a thermal head having heat elements as described below.

The smart device 2 is a terminal that can be easily carried around by the user, such as a smartphone or a tablet terminal. The smart device 2 has a communicator that sends and receives data using a specific communication protocol, and communicates with the thermal printer 1 through the communicator. The smart device 2 also has a storage battery (battery) and operates using power stored in the storage battery. The smart device 2 can charge the storage battery with a power supply of 5 V supplied from a USB connector described below. An application for producing print data is also installed on the smart device 2.

Triggered by a user command, the smart device 2 sends control-related commands and printing-related commands to the thermal printer 1. When these commands are received, the thermal printer 1 stores the commands in a receive buffer described below. The control-related commands include configuration commands specifying the print format, and status request commands requesting information indicating the status of the thermal printer 1. The printing-related commands include print commands instructing printing, carriage return commands instructing a carriage return, line feed commands instructing a line feed, and cutter commands instructing cutting the recording medium. The commands related to printing are commands that instruct driving one or more of the thermal line head, conveyance motor, and cutter drive motor.

Triggered by a user command, the smart device 2 generates print data for the text or images printed by the thermal printer 1. The smart device 2 then sends print commands including the generated print data to the thermal printer 1 according to a specific communication protocol. The thermal printer 1 then executes the print commands and prints text or images on the recording medium based on the print data.

The AC adapter 4 connects to the commercial power source 5 through a cable, rectifies, smoothes, and voltage converts power from a 100 VAC commercial power source 5, for example, and supplies 24 VDC power to the thermal printer 1 through a cable. The AC adapter 4 is removably connected to the thermal printer 1 through a connector.

As shown in FIG. 1, the thermal printer 1 has a controller 11, nonvolatile memory 12, receive buffer 13, power supply circuit 14 (power supply), USB (Universal Serial Bus) connector 15, communicator 16, and print mechanism 17 (operator).

The controller 11 includes a CPU as an operator. ROM (read-only memory) is connected to the controller 11, and a control program that can be executed by the CPU and data related to the control program are stored in nonvolatile ROM. the controller 11 controls the printing operation of the print mechanism 17, and other parts of the thermal printer 1, by running a control program stored in ROM.

The nonvolatile memory 12 is a semiconductor storage device such as EEPROM or flash memory, or a storage medium such as a hard disk drive, that stores rewritable data.

The receive buffer 13 is RAM (random access memory) or other type of temporary storage area, and may be a semiconductor memory device. The receive buffer 13 stores command received from an external device by the communicator 16 as controlled by the controller 11.

The power supply circuit 14 connects to the AC adapter 4 through a connector, and supplies power to parts of the thermal printer 1 based on the power supplied from the AC adapter 4.

The USB connector 15 is exposed to the outside of the thermal printer 1, and has four terminals, including two power supply terminals (VBUS/GND) and two communication terminals (D+/D−), for example, conforming to the USB standard. The USB connector 15 supplies power to the connected external device through the two power supply terminals as controlled by the controller 11. Note that for simplicity, the voltage supplied from the USB connector 15 to the external device is referred to below as VBUS. The voltage VBUS of the power supplied by the USB connector 15 to the external device is generally 5 V. In this example, the smart device 2 connects through a USB cable 3 to the USB connector 15, and power is supplied to the smart device 2 through the USB cable 3. The USB cable 3 is a cable conforming to the USB standard.

The USB connector 15 also detects connection of an external device. A detection signal is output to the controller 11.

The communicator 16 exchanges data by wire with an external device through the USB connector 15 according to a specific communication protocol. In this example, the communicator 16 exchanges data with the external device using the USB standard. The communicator 16 can also communicate data with the external device without going through the USB connector 15. In this event, the communicator 16 exchanges data with the external device according to a non-USB protocol, which may be a wireless protocol such as Wi-Fi®, Bluetooth®, or Ethernet®.

The print mechanism 17 prints based on the print data received from the smart device 2 or other external device as controlled by the controller 11. The print mechanism 17 includes a line thermal head 171, printhead driver 173, conveyance motor 174, and cutter drive motor 175.

The line thermal head 171 has multiple heat elements 172 arrayed in a line perpendicular to the conveyance direction of the thermal roll paper, and prints text and images by energizing the heat elements 172 to apply heat to the recording surface of the thermal roll paper.

The printhead driver 173 controls energizing the heat elements 172 of the line thermal head 171 as controlled by the controller 11.

The conveyance motor 174 causes the conveyance rollers to turn and convey the thermal roll paper as controlled by the controller 11.

The cutter drive motor 175 drives a movable knife to slide against the fixed knife and cut the thermal roll paper as controlled by the controller 11.

As shown in FIG. 1, the printhead driver 173, conveyance motor 174, and cutter drive motor 175 are connected to the power supply circuit 14, and operate using power supplied from the power supply circuit 14.

The smart device 2 and thermal printer 1 in this example are used in a POS (point-of-sale) system. A POS system is a system used in retail sales in shopping centers, department stores, convenience sales, and mobile vending carts on board trains, for example, as well as in restaurant, coffee shop, and other food service business operations. A POS system has functions for processing transactions based on the products purchased by a customer, and for producing receipts based on the transactions.

An example of a POS system used in a restaurant or other food service business is described below. In this POS system, a smart device 2 is assigned to each waiter in the restaurant, and the waiters carry the smart device 2 with them as they move through the restaurant. To produce a receipt for a customer, the waiter operates the smart device 2 to send print data to a thermal printer 1 installed in the restaurant, thereby causing the thermal printer 1 to produce a receipt based on the print data. As a result, the thermal printer 1 produces a receipt in response to the operation performed on the smart device 2.

Because the smart device 2 is carried by the user, the storage battery of the smart device 2 must be periodically recharged.

The thermal printer 1 in this example supplies power with a voltage VBUS of 5 V to the smart device 2 through the USB connector 15. The smart device 2 then charges the storage battery with the power received from the thermal printer 1.

However, depending on the voltage of the power supplied to the smart device 2, the required power may exceed the capacity of the AC adapter 4 when the thermal printer 1 is printing. In other words, when the thermal printer 1 prints, the sum of the power required to operate the print mechanism 17 and the power supplied to the smart device 2 may be greater than the capacity of the AC adapter 4. This may result in damage to the thermal printer 1 and the AC adapter 4 as well as the thermal printer 1 being unable to print.

The thermal printer 1 according to this embodiment therefore operates as described below so that the required power does not exceed the capacity of the AC adapter 4.

Figure 2:
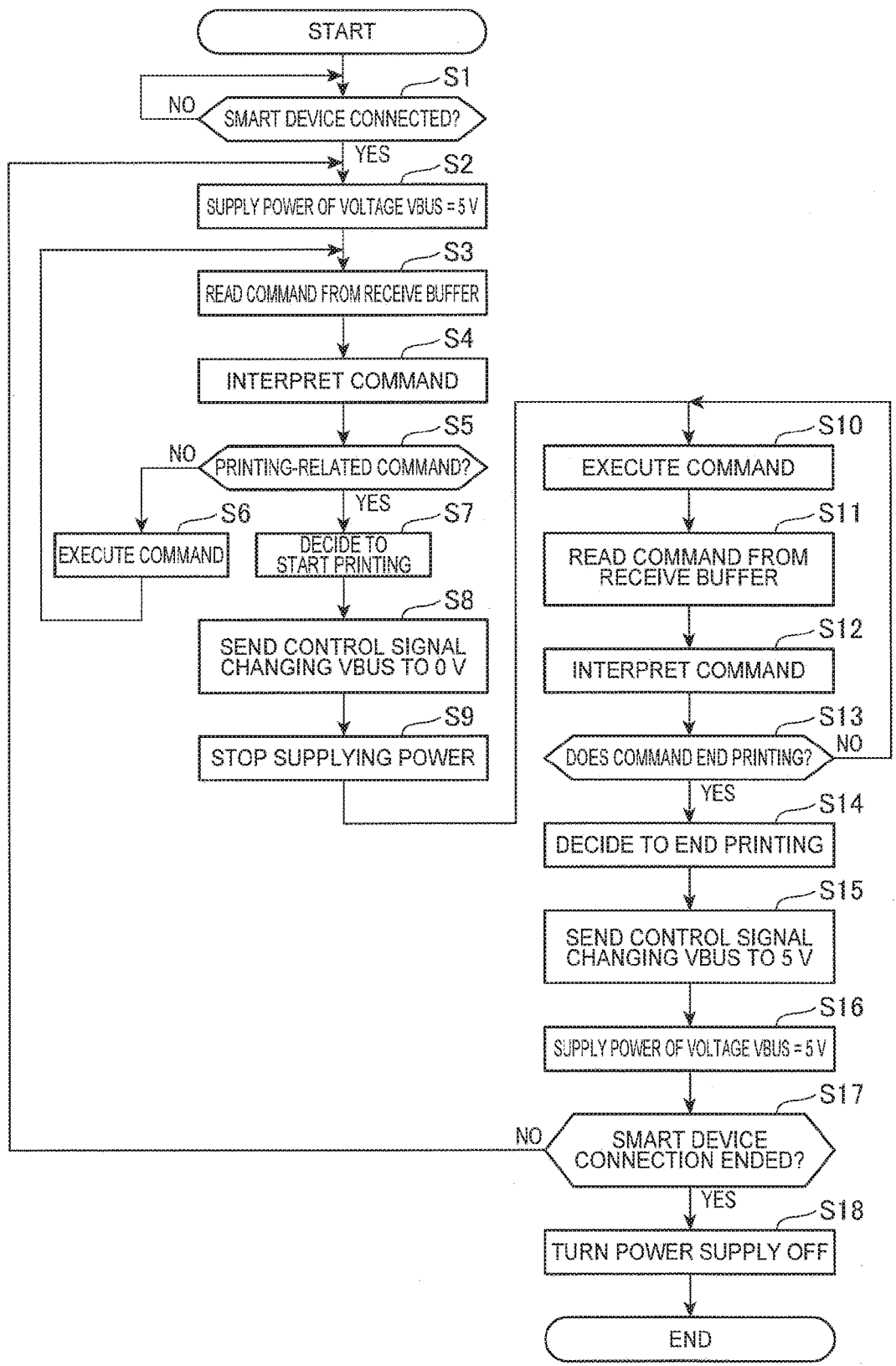
FIG. 2 is a flow chart of the operation of the thermal printer.

FIG. 2 is a flow chart of the operation of the thermal printer 1 according to this embodiment, particularly the operation of the controller 11.

In the operation shown in FIG. 2, the communicator 16 communicates data with the smart device 2 using a communication protocol other than USB, and in this example uses Wi-Fi®. More specifically, the communicator 16 does not use the USB connector 15 for data communication.

Based on the detection signal output from the USB connector 15, the controller 11 of the thermal printer 1 determines if a smart device 2 was connected (step S1). If the controller 11 determines a smart device 2 was connected (step S1: YES), it supplies power with a 5-V voltage VBUS from the power supply circuit 14 through the USB connector 15 to the smart device 2 (step S2). Using the supplied power, the smart device 2 charges the storage battery.

Next, the controller 11 reads the commands received from the smart device 2 by the communicator 16 from the receive buffer 13 (step S3), and interprets the read commands (step S4). If the controller 11 determines the read command is not a command related to printing (step S5: NO), it executes the command (step S6). For example, if the read command is a status request command, the controller 11 outputs status information indicating the state of the thermal printer 1 to the smart device 2.

However, if the read command is a printing-related command (step S5: YES), the controller 11 decides to start printing (step S7). As described above, the printing-related commands are print commands, carriage return commands, line feed commands, and cutter commands. A print command, a carriage return command, and a line feed command are equivalent to commands that start printing. A cutter command is equivalent to a command that ends printing. However, the controller 11 also determines to start printing in step S7 when a cutter command is read in step S3.

When the controller 11 determines to start printing, it generates a control signal controlling the voltage VBUS so that the voltage VBUS goes from 5 V to 0 V, and sends the control signal to the power supply circuit 14 (step S8). When the control signal is received, the power supply circuit 14 changes the voltage VBUS from 5 V to 0 V based on the control signal. Two methods of switching the voltage VBUS are described below.

Figure 3A:
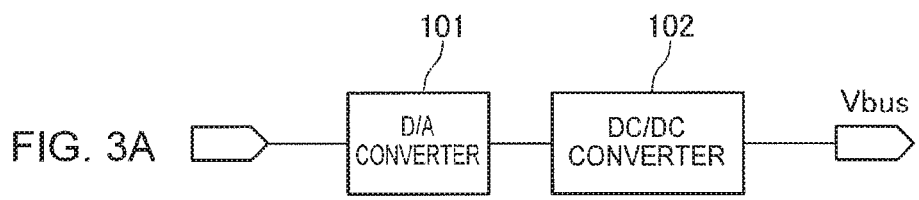
FIG. 3A and FIG. 3B show examples of the power supply circuit.
Figure 3B:
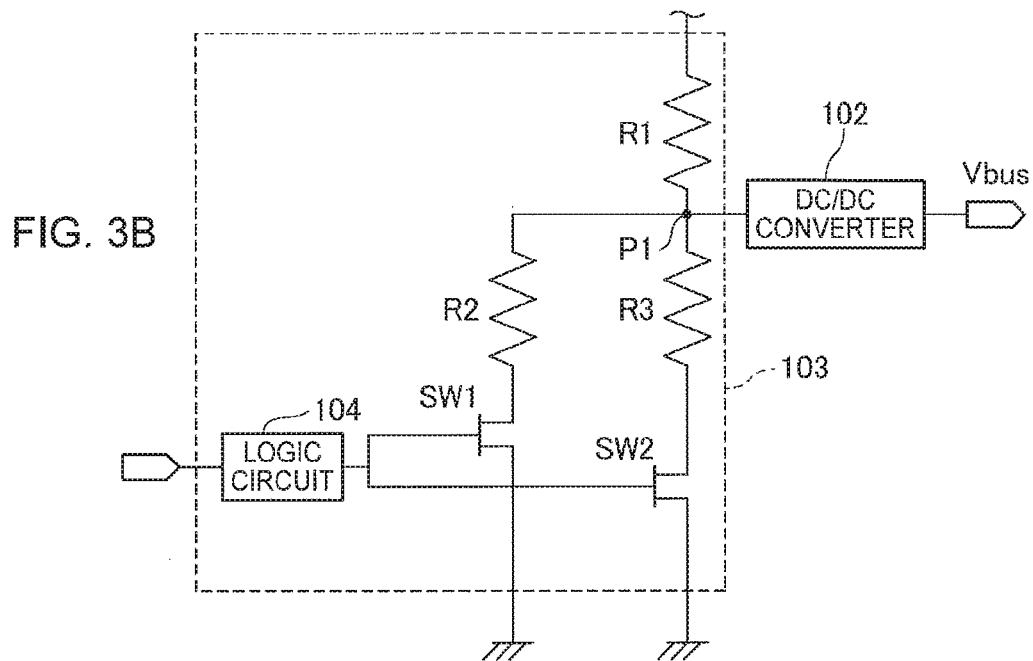

FIG. 3A and FIG. 3B show examples of the configuration of the power supply circuit 14, FIG. 3A showing a first example and FIG. 3B showing a second example.

First Method

In the example shown in FIG. 3A, the power supply circuit 14 has a D/A converter 101, and a DC/DC converter 102. The D/A converter 101 converts digital signals to analog signals. The DC/DC converter 102 converts a DC voltage to a different DC voltage, and outputs a voltage of 5 V as the voltage VBUS. The DC/DC converter 102 has a reference voltage, and controls the output voltage by comparing the output voltage with the reference voltage. In this first method, the D/A converter 101 to which the control signal is input changes the reference voltage of the DC/DC converter 102 to change the output voltage.

Second Method

In the example in FIG. 3B, the power supply circuit 14 has a DC/DC converter 102 and a voltage divider 103 that voltage divides the reference voltage of the DC/DC converter 102. The voltage divider 103 includes resistances R1 to R3, switches SW1 and SW2 embodied by FETs, for example, and a logic circuit 104. One end of resistance R1 is connected to one end of resistance R2 and resistance R3 at the voltage division node P1 that divides the reference voltage. Resistance R2 and resistance R3 are connected in parallel. Switch SW1 is connected in series to the other end of resistance R2. Switch SW2 is connected in series to the other end of resistance R3. Switches SW1 and SW2 connect to the logic circuit 104. The control signal is input to the logic circuit 104, which outputs a High or Low level signal based on the input control signal. In this second method, the logic circuit 104 converts the signal from the controller 11 to a High or Low level signal, and outputs to switch SW1 or switch SW2. In other words, this second method changes the reference voltage by voltage division at the voltage division node P1 according to the on/off states of switch SW1 and switch SW2, and thereby changes the output voltage.

The power supply circuit 14 thus changes the value of voltage VBUS when the control signal is input. Note that the method of changing the voltage VBUS is not limited to the methods described above.

Referring again to FIG. 2, the controller 11 changes the voltage VBUS from 5 V to 0 V by means of the power supply circuit 14, and stops supplying power to the smart device 2 through the USB connector 15 (step S9). Next, the controller 11 executes the printing-related commands (step S10), and controls the print mechanism 17 to print. When executing the print command, the controller 11 drives the printhead driver 173 to print. To execute a carriage return command, the controller 11 drives the conveyance motor 174 to execute the carriage return. To execute a line feed command, the controller 11 drives the conveyance motor 174 to advance the recording medium. To execute a cutter command, the controller 11 drives the cutter drive motor 175 to cut the recording medium.

The controller 11 thus stops supplying power from the power supply circuit 14 to the smart device 2 before power consumption by the printhead driver 173, conveyance motor 174, and cutter drive motor 175 increases to print. As a result, the controller 11 can reduce the power required by the thermal printer 1. The power required by the thermal printer 1 exceeding the capacity of the AC adapter 4 can therefore be suppressed, and supplying power to the print mechanism 17 is not affected. The controller 11 can therefore print appropriately with the print mechanism 17. The power required by the thermal printer 1 can also be reduced when a command that is equivalent to a stop printing command is read accidentally.

When the power supplied to the smart device 2 is stopped while communicating data through a USB connection, data communication generally stops. However, because data is not communicated through the USB connector 15, there is no need to consider communication of data according to the USB standard. In other words, the thermal printer 1 can receive printing-related commands and print even if supplying power to the smart device 2 is stopped. Furthermore, because supplying power stops, the amount of power required by the thermal printer 1 can be reliably reduced. Stopping the supply of power when printing is therefore a superior method of controlling the supply of power when data communication does not go through the USB connector 15.

The controller 11 then reads the next command received by the communicator 16 from the receive buffer 13 (step S11), and interprets the read commands (step S12). By interpreting the commands, the controller 11 determines if the the command that was read is a command instructing ending printing (step S13). A command that ends printing is a cutter command in this example. If the controller 11 determines the command is not a command that ends printing (step S13: NO), the controller 11 executes the command that was read.

If the command is a command that ends printing (step S13: YES), the controller 11 determines to stop printing (step S14). If the controller 11 determines that printing ends, it generates a control signal that controls the power supply circuit 14 to change the voltage VBUS from 0 V to 5 V, and sends the command to the power supply circuit 14 (step S15). Next, the controller 11 changes the voltage VBUS from 0 V to 5 V and starts supplying power to the smart device 2 by the power supply circuit 14 (step S16).

Next, based on the detection signal from the USB connector 15, the controller 11 determines if the connection between the smart device 2 and the thermal printer 1 was cut (step S17). If the connection was not cut (step S17: NO), the controller 11 continues supplying power through the power supply circuit 14. If the connection was cut (step S17: YES), the controller 11 stops supplying power (step S18).

The operation of the thermal printer 1 when printing with the smart device 2 connected is described next.

Figure 4A:
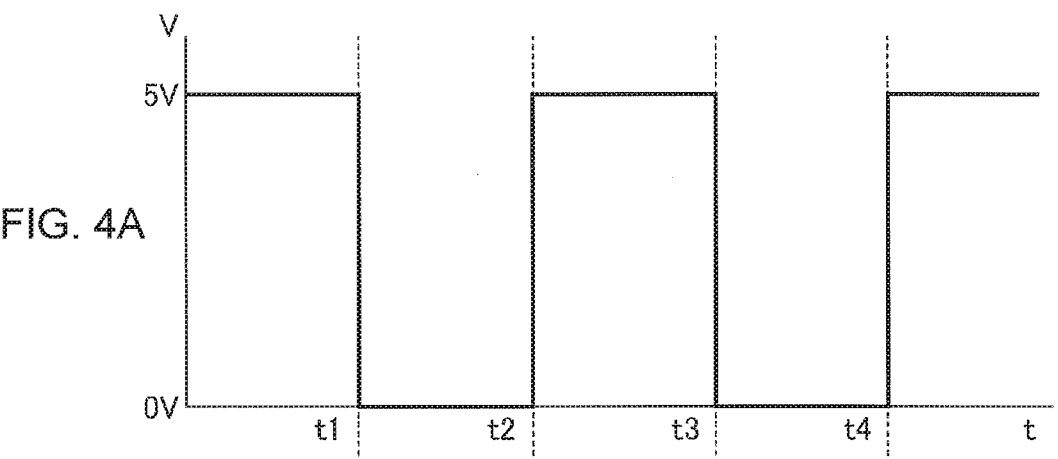
FIG. 4A and FIG. 4B are graphs showing examples of the change in the voltage the thermal printer supplies.
Figure 4B:
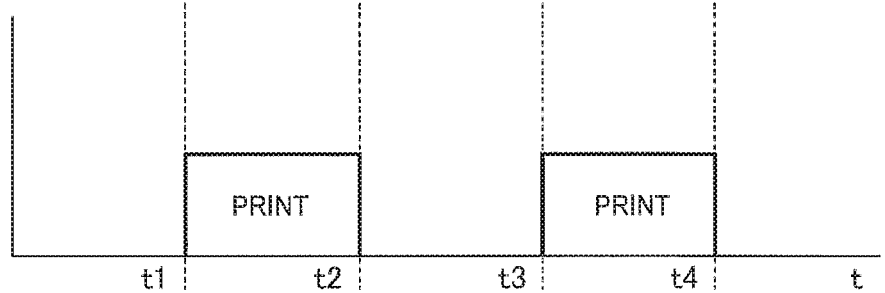

FIG. 4A and FIG. 4B show the change in voltage supplied by the thermal printer 1. FIG. 4A is a graph of the voltage VBUS, and FIG. 4B shows when the print mechanism 17 is operating and not operating. The Y-axis in FIG. 4A shows the voltage VBUS. Time is shown on the X-axis in FIG. 4A and FIG. 4B.

When the controller 11 of the thermal printer 1 determines at time t1 that the command read from the receive buffer 13 is a printing-related commands and starts printing, it controls the power supply circuit 14 to change the voltage VBUS from 5 V to 0 V and stops supplying power. The supply of power remains stopped after time t1.

At time t2 the command read from the receive buffer 13 is a command instructing stopping printing, and the thermal printer 1 determines to stop printing. The power supply circuit 14 of the thermal printer 1 therefore changes the voltage VBUS from 0 V to 5 V and starts supplying power. As a result, because the thermal printer 1 resumes supplying power when printing stops, the thermal printer 1 can supply power to the smart device 2 again after printing ends. In other words, the smart device 2 can resume charging the storage battery of the smart device 2 through the USB connector 15 after printing ends.

When the controller 11 of the thermal printer 1 determines at time t3 to start printing again based on the command read from the receive buffer 13, the power supply circuit 14 of the thermal printer 1 changes the voltage VBUS from 5 V to 0 V and stops supplying power. The supply of power remains stopped after time t3. When ending printing is determined based on the command read from the receive buffer 13 at time t4, the power supply circuit 14 of the thermal printer 1 changes voltage VBUS from 0 V to 5 V and starts supplying power again.

The thermal printer 1 thus changes voltage VBUS from 5 V to 0 V when printing starts, and changes voltage VBUS from 0 V to 5 V when printing ends. Because the voltage VBUS thus changes when printing starts and when printing ends, the power required by the thermal printer 1 can be reliably reduced while printing. The thermal printer 1 can therefore prevent the amount of power required while printing from exceeding the capacity of the AC adapter 4, and can supply sufficient power to the print mechanism 17.

Furthermore, the thermal printer 1 can supply sufficient power to the print mechanism 17 while printing when a smart device 2 is connected, and can supply power to the smart device 2 when not printing. When connected to the thermal printer 1, the smart device 2 can therefore print as desired through the thermal printer 1 and can charge the storage battery of the smart device 2.

As described above, a thermal printer 1 according to this embodiment of the invention has a USB connector 15 (connector) that connects to a smart device 2 (external device); a power supply circuit 14 (power supply); a print mechanism 17 (operator) that operates using power supplied from the power supply circuit 14; a communicator that communicates with the smart device 2; and a controller 11 that receives instructions to start or stop operation of the print mechanism 17 from the smart device 2 through the communicator 16, and controls supplying power from the power supply circuit 14 to the smart device 2 according to the timing when operation of the print mechanism 17 starts and stops.

Because supplying power to the smart device 2 is controlled according to the timing when operation of the print mechanism 17 starts and stops, power can be supplied to the smart device 2 without affecting the supply of power to the print mechanism 17.

The controller 11 in this embodiment of the invention receives a start printing command as an instruction to start printing with the print mechanism 17 from the smart device 2 through the communicator 16, and receives a stop printing command as an instruction to stop printing. The controller 11 controls supplying power from the power supply circuit 14 to the smart device 2 based on the timing when the print mechanism 17 starts or stops printing.

As a result, by controlling the supply of power to the smart device 2 according to the timing when printing starts and stops based on a command, power can be supplied to the smart device 2 without affecting the supply of power to the print mechanism 17.

When the print mechanism 17 starts printing, the controller 11 stops supplying power to from the power supply circuit 14 to the smart device 2, and starts supplying power to from the power supply circuit 14 to the smart device 2 when the print mechanism 17 stops printing.

As a result, supplying power to the smart device 2 can be controlled by stopping or starting power. The communicator 16 in this embodiment of the invention communicates data using a standard other than USB. As a result, printing-related commands can be received and printing is possible even if supplying power to the smart device 2 stops.

Embodiment 2

A second embodiment of the invention is described next. The configuration of the thermal printer 1 in this embodiment is the same as in the first embodiment, and further description thereof is omitted.

The first embodiment describes supplying power to the smart device 2 according to the USB standard without communicating data through the USB connector 15. This second embodiment of the invention describes supplying power while using the USB standard for data communication with the smart device 2.

A first threshold voltage Vth1 indicating the voltage at which the smart device 2 stops charging, and a second threshold voltage Vth2 indicating the voltage at which the communication operation stops, are previously stored in the nonvolatile memory 12 of the thermal printer 1 in the second embodiment of the invention.

The first threshold voltage Vth1 and second threshold voltage Vth2 are set lower than 5 V. The first threshold voltage Vth1 is set higher than the second threshold voltage Vth2.

Figure 5:
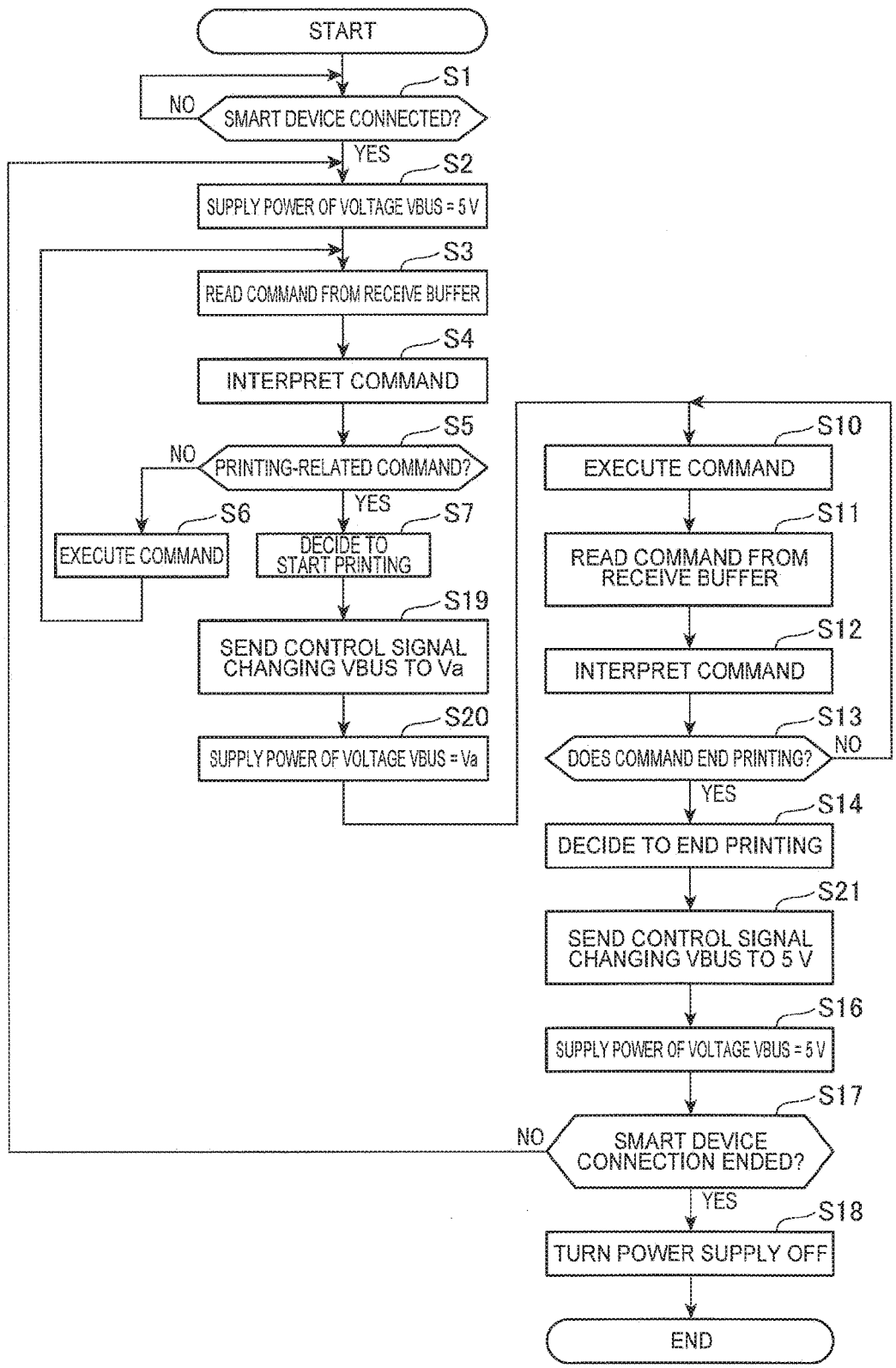
FIG. 5 is a flow chart of the operation of a thermal printer according to a second embodiment of the invention.

FIG. 5 is a flowchart of the operation of the thermal printer 1 in the second embodiment. Steps in the flow chart in FIG. 5 that are the same as the steps in the flowchart in FIG. 2 are identified by the same reference numerals and further description thereof is omitted.

As shown in FIG. 5, the controller 11 reads the commands received by the communicator 16 from the receive buffer 13 (step S3), and interprets the read commands (step S4). If the controller 11 determines the read command is a command related to printing (step S5: YES), the controller 11 determines to start printing (step S7). When the controller 11 determines to start printing, it generates a control signal controlling the voltage VBUS so that the voltage VBUS goes from 5 V to a voltage Va (first voltage) that is less than the first threshold voltage Vth1 and greater than the second threshold voltage Vth2, and sends the control signal to the power supply circuit 14 (step S19). Next, the controller 11 supplies power with voltage VBUS set to voltage Va to the smart device 2 (step S20).

When the controller 11 executes a printing-related commands (step S10), it reads a command from the receive buffer 13 (step S11), and interprets the command that is read (step S12). If the controller 11 determines that the read command is a command equivalent to a command instructing stopping printing (step S13: YES), it determines to stop printing (step S14). When the controller 11 determines to stop printing, it generates a control signal controlling changing voltage VBUS from voltage Va to 5 V, and sends the control signal to the power supply circuit 14 (step S21). The controller 11 then supplies power with the voltage VBUS set to 5 V (step S16).

The controller 11 thus changes the voltage VBUS supplied by the power supply circuit 14 from 5 V to voltage Va and supplies power of voltage Va to the smart device 2 before power consumption by the printhead driver 173, conveyance motor 174, and cutter drive motor 175 increases for printing. Because voltage Va is lower than 5 V, the power required by the thermal printer 1 can be prevented from exceeding the capacity of the AC adapter 4, and supplying power to the print mechanism 17 is not affected.

This voltage Va is the voltage at which voltage VBUS is lower than the first threshold voltage Vth1 and greater than the second threshold voltage Vth2. As a result, by supplying power with the voltage VBUS set to voltage Va, the thermal printer 1 can print based on printing-related commands received through a USB connection. In other words, the thermal printer 1 cannot print if the supply of power is stopped as described in the first embodiment. Supplying power with voltage VBUS set to voltage Va when printing is therefore a superior method of supplying power when data is communicated through the USB connector 15.

The operation of the thermal printer 1 when printing with the smart device 2 connected is described next.

Figure 6A:
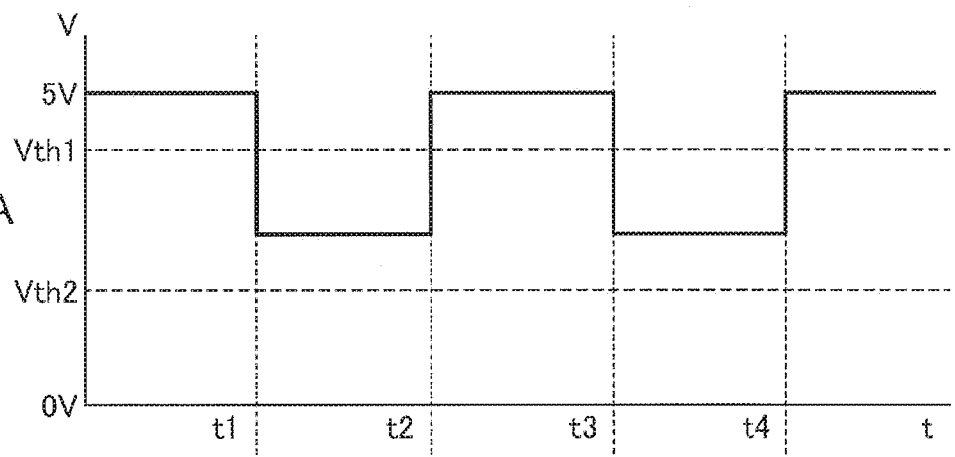
FIG. 6A and FIG. 6B are graphs showing examples of the change in the voltage supplied by the thermal printer according to the second embodiment of the invention.
Figure 6B:
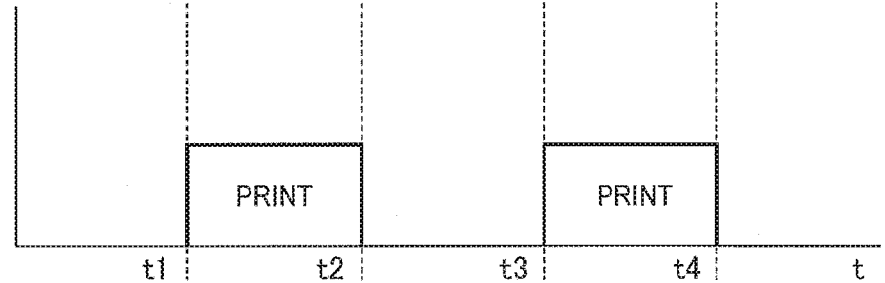

FIG. 6A and FIG. 6B show the change in voltage supplied by the thermal printer 1. FIG. 6A is a graph of the voltage VBUS, and FIG. 6B shows when the print mechanism 17 is operating and not operating. The Y-axis in FIG. 6A shows the voltage VBUS. Time is shown on the X-axis in FIG. 6A and FIG. 6B.

When the controller 11 of the thermal printer 1 determines at time t1 that the command read from the receive buffer 13 is a printing-related commands and starts printing, it controls the power supply circuit 14 to change the voltage VBUS from 5 V to voltage Va and stops supplying power of voltage Va. As described above, voltage Va is less than first threshold voltage Vth1 and greater than second threshold voltage Vth2. The supply of power of voltage Va continues from time t1.

At time t2 the command read from the receive buffer 13 is a command instructing stopping printing, and the thermal printer 1 decides to stop printing. The power supply circuit 14 of the thermal printer 1 therefore changes the voltage VBUS from voltage Va to 5 V and resumes supplying power with voltage VBUS set to 5 V. As a result, the thermal printer 1 supplies power of a voltage exceeding the first threshold voltage Vth1 when printing stops. The smart device 2 can resume charging the storage battery of the smart device 2 after printing ends.

When the controller 11 of the thermal printer 1 determines at time t3 to start printing again based on the command read from the receive buffer 13, the power supply circuit 14 of the thermal printer 1 changes the voltage VBUS from 5 V to voltage Va and supplies power of voltage Va. Supplying power of voltage Va then continues from time t3. When ending printing is decided based on the command read from the receive buffer 13 at time t4, the power supply circuit 14 of the thermal printer 1 changes voltage VBUS from voltage Va to 5 V and resumes supplying power of voltage VBUS set to 5 V.

The thermal printer 1 thus changes voltage VBUS from 5 V to voltage Va when printing starts, and changes voltage VBUS from voltage Va to 5 V when printing ends. The thermal printer 1 can therefore prevent the amount of power required while printing from exceeding the capacity of the AC adapter 4, and the power supplied to the print mechanism 17 is not affected. More specifically, the controller 11 can print as desired with the print mechanism 17.

Furthermore, the thermal printer 1 can supply sufficient power to the print mechanism 17 while printing when a smart device 2 is connected, and can supply power to the smart device 2 when not printing. When connected to the thermal printer 1, the smart device 2 can therefore print as desired through the thermal printer 1 and can charge the storage battery of the smart device 2.

When operation of the print mechanism 17 starts, the controller 11 changes the voltage supplied from the power supply circuit 14 to the voltage Va (first voltage), and when operation of the print mechanism 17 ends, changes the voltage supplied from the power supply circuit 14 to a voltage greater than voltage Va.

More specifically, the controller 11 supplies power for charging the storage battery (battery) of the smart device 2 from the power supply circuit 14. The controller 11 has a first threshold voltage Vth1 indicating the voltage at which the smart device 2 stops charging the storage battery, and a second threshold voltage Vth2 indicating the voltage at which the smart device 2 stops the communication operation. When starting operation of the print mechanism 17, the controller 11 changes the supplied voltage to a voltage Va that is lower than the first threshold voltage Vth1 and greater than the second threshold voltage Vth2, and when operation of the print mechanism 17 ends, changes the voltage supplied from the power supply circuit 14 to a voltage greater than the first threshold voltage Vth1.

The supply of power to the smart device 2 can thus be controlled by changing the voltage. Because power of a voltage Va lower than the first threshold voltage Vth1 and greater than the second threshold voltage Vth2 is supplied to the smart device 2 when printing, there is no effect on the supply of power to the print mechanism 17 of the thermal printer 1. Furthermore, because the thermal printer 1 supplies power of voltage Va, data communication with the smart device 2 can continue through the USB connection.

Preferred embodiments of the invention are described above, but the invention is not limited thereto and can varied and adapted in many ways.

For example, the first embodiment describes a configuration in which the thermal printer 1 communicates with the smart device 2 using a communication protocol other than USB, but is not limited to communicating with the smart device 2. Configurations in which the thermal printer 1 communicates with external devices other than a smart device 2 are also conceivable.

The second embodiment describes a configuration in which the thermal printer 1 stores a first threshold voltage Vth1 and a second threshold voltage Vth2, but may be configured to receive the threshold voltages from the smart device 2.

A thermal printer 1 is used as an example of the printing device in the foregoing embodiments, but the invention is not so limited and may be applied to an inkjet printer, dot impact printer, laser printer, or other type of printer. The invention is also not limited to printers, and may be applied to electronic devices or electrical devices with other functions, or any other device that supplies power from a USB connector 15.

The invention being thus described, it will be apparent to one skilled in the art that many variations are possible. Such variations are not to be regarded as a departure from the spirit and scope of the invention; rather, all such variations are intended to be included within the scope of the following claims.

What is claimed is:

1. A printing device configured to communicate with an external device and supply power to the external device, the printing device comprising:
   a power supply;
   a print mechanism configured to print on paper and configured to operate using power supplied from the power supply;
   a cutter configured to cut the paper and configured to operating using power supplied from the power supply;
   a connector configured to connect and supply power to the external device; and
   a processor programmed to:
      process a first command received from the external device, the first command instructing operation of the print mechanism, and
      control the power supply to change an amount of power supplied to the external device,
   wherein the first command includes at least one of a print command, a carriage return command, a line feed command, and/or a cutter command instructing operation of the cutter to cut the paper, and
   wherein the processor is programmed such that, when the first command is received, the processor lowers the amount of power supplied to the external device before processing the first command.

2. The printing device of claim 1, wherein:
   after the processor processes a second command received from the external device, the second command instructing ending operation of the printing mechanism, the processor increases the amount of power supplied to the external device.

3. The printing device of claim 1, wherein:
   the power supply connects to an AC adapter, and supplies power to the printing mechanism, the cutter, and the external device based on power supplied from the AC adapter.

4. The printing device of claim 1, wherein:
   the processor is programmed to process the first command received from the external device via a wireless connection, and the connector is configured to communicate by wire with the external device.

5. The printing device of claim 1, wherein the processor is programmed to process the first command received from the external device via a USB standard, a Wi-Fi protocol, a Bluetooth protocol, and/or an Ethernet protocol.

6. A printing device configured to communicate with an external device and supply power to the external device, the printing device comprising:
   a power supply;
   a print mechanism configured to print on paper and configured to operate using power supplied from the power supply;
   a cutter configured to cut the paper;
   a connector configured to connect and supply power to the external device; and
   a processor programmed to:
      process a first command and a second command received from the external device, the first command instructing operation of the print mechanism, and the second command instructing operation of the cutter to cut the paper, and
      control the power supply to change an amount of power supplied to the external device,
   wherein the processor is programmed such that, when the first command is received, the processor lowers the amount of power supplied to the external device from a first voltage to a second voltage, before processing the first command, and
   wherein the processor is programmed such that, when the second command is received, the processor increases the amount of power supplied to the external device from the second voltage to the first voltage, after executing the second command.

7. A printing device configured to communicate with an external device and supply power to the external device having a battery, the printing device comprising:
   a power supply;
   a print mechanism configured to print on paper and configured to operate using power supplied from the power supply;
   a connector configured to connect and supply power to the external device, and configured to receive a first command from the external device, the first command instructing operation of the print mechanism; and
   a processor programmed to process the first command received via the connector, and control the power supply to change an amount of power supplied to the external device,
   wherein the processor is programmed such that, when the first command is received via the connector, the processor lowers the amount of power supplied to the external device from a first voltage to a second voltage, before processing the first command,
   wherein the second voltage is (i) less than a first threshold voltage, which is a voltage at which the external device stops a battery charging operation, and (ii) greater than a second threshold voltage, which is a voltage at which the external device stops communicating data with the printing device.

8. A control method of a printing device, the control method comprising:
   providing a printing device comprising:
      a print mechanism configured to print on paper, and
      a cutter configured to cut the paper,
         wherein the printing device is configured to communicate with an external device and supply power to the external device;
   receiving, from the external device, a first command instructing operation of the print mechanism or the cutter, wherein the first command includes at least one of a print command, a carriage return command, a line feed command, and/or a cutter command instructing operation of the cutter to cut the paper; and
   when the first command is received from the external device, lowering the amount of power supplied to the external device before processing the first command.

9. The control method of the printing device described in claim 8, the control method further comprising:
   receiving, from the external device, a second command instructing ending operation of the print mechanism or the cutter; and
   resuming supplying power to the external device after executing the second command.

10. The control method of claim 8, wherein:
    the printing device connects to an AC adapter, and supplies power to the print mechanism, the cutter, and the external device based on power supplied from the AC adapter.

11. The control method of claim 8, wherein:
    the printing device is configured to communicate wirelessly or by wire, with the external device.

12. A control method of a printing device having a print mechanism configured to print on paper and a cutter configured to cut the paper, the printing device being configured to communicate with an external device and supply power to the external device, the control method comprising:
receiving, from the external device, a first command instructing operation of the print mechanism;
when the first command is received from the external device, lowering the amount of power supplied to the external device from a first voltage to a second voltage, before processing the first command;
receiving, from the external device, a second command instructing operation of the cutter to cut the paper; and
when the second commend is received from the external device, increasing the amount of power supplied to the external device from the second voltage to the first voltage, after executing the second command.

13. A control method of a printing device having a print mechanism configured to print on paper and a cutter configured to cut the paper, the printing device being configured to communicate with an external device having a battery and to supply power to the external device, the control method comprising:
receiving, from the external device, a first command instructing operation of the print mechanism, wherein the first command includes at least one of a print command, a carriage return command, a line feed command, and/or a cutter command instructing operation of the cutter to cut the paper; and
when the first command is received from the external device, lowering the amount of power supplied to the external device from a first voltage to a second voltage, before processing the first command,
wherein the printing device includes a connector that connects and supplies power to the external device, and receive the first command from the external device, and
wherein the second voltage is (i) less than a first threshold voltage, which is a voltage at which the external device stops a battery charging operation, and (ii) greater than a second threshold voltage, which is a voltage at which the external device stops communicating data with the printing device.

14. The control method of claim 13, wherein the first voltage is higher than the first threshold voltage.

15. A printing device configured to communicate with an external device and supply power to the external device, the printing device comprising:
a power supply;
a print mechanism configured to print on paper and configured to operate using power supplied from the power supply;
a connector configured to connect and supply power to the external device via a wired connection between the connector and the external device; and
a processor programmed to:
process a first command received from the external device via a wireless connection, the first command instructing operation of the print mechanism, and
control the power supply to change an amount of power supplied to the external device,
wherein the processor is programmed such that, when the first command is received, the processor lowers the amount of power supplied to the external device before processing the first command.

16. The printing device of claim 15, wherein a protocol of the wireless connection is a Wi-Fi protocol, a Bluetooth protocol, or an Ethernet protocol.

17. A printing device configured to communicate with an external device and supply power to the external device, the printing device comprising:
a power supply;
a print mechanism configured to print on paper and configured to operate using power supplied from the power supply;
a cutter configured to cut the paper;
a connector configured to connect and supply power to the external device, and configured to receive a first command from the external device, the first command instructing operation of the print mechanism; and
a processor programmed to process the first command received via the connector, and control the power supply to change an amount of power supplied to the external device,
wherein the first command includes at least one of a print command, a carriage return command, a line feed command, and/or a cutter command instructing operation of the cutter to cut the paper, and
wherein the processor is programmed such that, when the first command is received via the connector, the processor lowers the amount of power supplied to the external device from a first voltage to a second voltage, before processing the first command.

18. The printing device of claim 17, wherein the second voltage is (i) less than a first threshold voltage, which is a voltage at which the external device stops a battery charging operation, and (ii) greater than a second threshold voltage, which is a voltage at which the external device stops communicating data with the printing device.

19. The printing device of claim 18, wherein, when the connector receives a second command, which instructs ending operation of the printing mechanism or the cutter, from the external device, the processor increases the amount of power supplied to the external device to the first voltage, after executing the second command.

20. The printing device of claim 19, wherein the first voltage is higher than the first threshold voltage.

* * * * *